(12) United States Patent
Iwamoto et al.

(10) Patent No.: US 6,167,892 B1
(45) Date of Patent: Jan. 2, 2001

(54) METHOD FOR WASHING PREFOAMED PARTICLES

(75) Inventors: Tomonori Iwamoto; Takema Yamaguchi; Minori Yamaguchi, all of Hyogo (JP)

(73) Assignee: Kaneka Corporation, Osaka (JP)

( * ) Notice: Under 35 U.S.C. 154(b), the term of this patent shall be extended for 0 days.

(21) Appl. No.: 09/284,565

(22) PCT Filed: Oct. 14, 1997

(86) PCT No.: PCT/JP97/03670

§ 371 Date: Apr. 16, 1999

§ 102(e) Date: Apr. 16, 1999

(87) PCT Pub. No.: WO98/17716

PCT Pub. Date: Apr. 30, 1998

(30) Foreign Application Priority Data

Oct. 17, 1996 (JP) ................................................. 8-274974

(51) Int. Cl.[7] ........................................................ B08B 3/04
(52) U.S. Cl. ................ 134/25.4; 134/16; 134/25.1; 134/26; 134/29; 134/34; 134/36; 134/42; 510/244; 510/434; 510/512; 521/58; 524/127; 524/190; 524/284; 524/310; 524/492
(58) Field of Search ................ 134/16, 25.1, 26, 134/29, 34, 36, 42; 510/244, 434, 512; 521/58; 524/127, 492, 310, 190, 284

(56) References Cited

U.S. PATENT DOCUMENTS

| 3,819,546 | * | 6/1974 | Alteres, Jr. ................ 260/2.5 B |
| 4,080,344 | * | 3/1978 | Ikeda et al. ................ 260/2.5 HB |
| 4,286,069 | * | 8/1981 | Millington et al. ................ 521/56 |
| 4,524,154 | * | 6/1985 | Maeda et al. ................ 521/58 |
| 5,041,465 |   | 8/1991 | Sonnenerg ................ 521/58 |
| 5,240,967 | * | 8/1993 | Sonnenberg et al. ................ 521/57 |
| 5,837,740 | * | 11/1998 | Haraguchi et al. ................ 521/60 |
| 5,889,285 | * | 3/1999 | Murata et al. ................ 251/182.3 |

FOREIGN PATENT DOCUMENTS

| 8-225675 |   | 9/1996 | (JP) . |
| 09124832 | * | 5/1997 | (JP) . |

OTHER PUBLICATIONS

European Search Report dated Jan. 12, 2000.

* cited by examiner

Primary Examiner—Sharidan Carrillo
(74) Attorney, Agent, or Firm—Armstrong, Westerman, Hattori, McLeland & Naughton

(57) ABSTRACT

A method of washing pre-expanded particles having a substantially water insoluble inorganic compound attached thereto by contacting the pre-expanded particles with an aqueous washing solution of a water soluble compound. The water soluble compound has a solubility with water of at least 1 g/100 g of water and has 1–500 surface bonding functional groups and 1–500 hydrophilic functional groups. At least one of the surface bonding functional groups of the water soluble compound attaches to the water insoluble inorganic compound.

11 Claims, No Drawings

METHOD FOR WASHING PREFOAMED PARTICLES

TECHNICAL FIELD

The present invention relates to a method for washing pre-expanded particles. More particularly, the present invention relates to a method for washing pre-expanded particles which are used for production of a thermoplastic resin internal die expansion molded article which is used as a cushioning and wrapping material, a carrying box, an adiabatic material, a bumper core of an automobile and the like.

BACKGROUND ART

It has been known that thermoplastic resin pre-expanded particles can be prepared by a method (hereinafter referred to as "pressure release expansion method") comprising dispersing thermoplastic resin particles into water containing a dispersant in a pressure container, adding a volatile blowing agent thereto, impregnating the thermoplastic resin particles with the volatile blowing agent with keeping high temperature and high pressure, and releasing the particles into a lower pressure atmosphere.

In the above pressure release expansion method, in order to prevent fusion between resin particles at high temperature and high pressure, in general, there are used a slightly water soluble inorganic compound (hereinafter sometimes referred to as "inorganic dispersant") as a dispersant and a surface active agent (hereinafter sometimes referred to as "auxiliary dispersant"). However, even after the resin particles at high temperature and high pressure are released into a lower pressure atmosphere to give pre-expanded particles, part of the inorganic dispersant remains on and attaches to the pre-expanded particles surface (hereinafter, the inorganic dispersant which remains on and attaches to the pre-expanded particles is sometimes referred to as "attaching dispersant"). If the amount of the attaching dispersant is large, fusion between the pre-expanded particles becomes bad when a mold is charged with the pre-expanded particles and the particles are heated with vapor to give an internal die expansion molded article.

In order to solve the above problem, in general, there are employed a method (A) comprising washing the pre-expanded particles with a large amount of water or warm water, and a method (B) comprising washing the pre-expanded particles with an acidic aqueous solution.

However, in the method (A), washing effect is poor, so that the attaching dispersant cannot be sufficiently removed. Also because a large amount of water is used, the method (A) is uneconomical.

On the other hand, in the method (B), because an equipment must be acid resistant, cost of the equipment becomes high. Also, in the case that the inorganic dispersant is insoluble in an acid, the method (B) is not effective.

Furthermore, waste water after washing is suitably treated and discharged. However, in the method (A), because a large amount of waste water must be treated, cost of the treatment becomes high. In the method (B), because the inorganic dispersant is water-solubilized, steps such as a reprecipitation step and an adsorption and removal step are needed. Accordingly, cost becomes high in addition to complication of the steps.

In order to provide a method for efficiently washing and removing the attaching dispersant without an acid resistant equipment, the inventors of the present invention have earnestly studied. As a result, it has been found that by washing pre-expanded particles prepared by the pressure release expansion method with an aqueous solution of a water soluble compound having a specific functional group in its molecule, the above problems can be solved. Then, the present invention has been accomplished.

DISCLOSURE OF THE INVENTION

The present invention relates to

① a method for washing pre-expanded particles prepared by charging a pressure container with an aqueous dispersion containing thermoplastic resin particles, a slightly water soluble inorganic compound as a dispersant and a surface active agent, and a volatile blowing agent, increasing the temperature to reach the constant pressure and the constant temperature, impregnating the thermoplastic resin particles with the volatile blowing agent, and releasing the particles into a lower pressure atmosphere, which is characterized in that
the pre-expanded particles are washed with an aqueous solution of a water soluble compound having at least one functional group capable of bonding to the surface of the slightly water soluble inorganic compound and at least one hydrophilic functional group in its molecule;

② the above method wherein the slightly water soluble inorganic compound is tricalcium phosphate, and the water soluble compound is a water soluble phosphate, a water soluble condensated phosphate or a mixture thereof;

③ the above method wherein the water soluble condensated phosphate is sodium hexametaphosphate;

④ the above method wherein the slightly water soluble inorganic compound is tricalcium phosphate, and the water soluble compound is a water soluble silicate;

⑤ the above method wherein the slightly water soluble inorganic compound is tricalcium phosphate, and the water soluble compound is a water soluble ethylenediamineteraacetate;

⑥ the above method wherein the slightly water soluble inorganic compound is tricalcium phosphate, and the water soluble compound is a water soluble citrate, a water soluble tartrate or a mixture thereof;

⑦ the above method wherein the slightly water soluble inorganic compound is tricalcium phosphate, and the water soluble compound is a sodium polyacrylate; and ⑧ the above method wherein the slightly water soluble inorganic compound is kaolin, and the water soluble compound is ethylenediaminehydrochloride.

BEST MODE FOR CARRYING OUT THE INVENTION

In the present invention, the pre-expanded particles are prepared by a conventionally known method, that is, the method (pressure release expansion method) comprising charging a pressure container with an aqueous dispersion containing thermoplastic resin particles, a slightly water soluble inorganic compound (inorganic dispersant) as a dispersant and a surface active agent (auxiliary dispersant), and a volatile blowing agent, increasing the temperature to reach the constant pressure and the constant temperature, impregnating the thermoplastic resin particles with the volatile blowing agent, and releasing the particles into a lower pressure atmosphere.

In the above pressure release expansion method, in order to prevent fusion between the thermoplastic resin particles in the pressure container, the inorganic dispersant and the auxiliary dispersant are used.

As the inorganic dispersant, conventionally used compounds can be used without particular limitation. Concrete examples of the inorganic dispersant are, for instance, an inorganic salt such as tricalcium phosphate, magnesium carbonate or calcium carbonate; clay such as bentonite or kaolin; and the like. Among them, from the viewpoint that dispersing power is great, tricalcium phosphate is preferable. From the viewpoint that dispersing power is great and no environment pollution occurs, kaolin is preferable. In general, the surface of the inorganic dispersant is charged with positive or negative electricity.

The above auxiliary dispersant is a component used for improving affinity between the thermoplastic resin particles and the inorganic dispersant and heightening dispersing power. As the auxiliary dispersant, conventionally used compounds can be used without particular limitation. Concrete examples of the auxiliary dispersant are, for instance, an anionic surface active agent such as sodium dodecylbenzenesulfonate, sodium n-paraffinsulfonate, sodium higher alcohol sulfate or sodium alkylnaphthalene sulfonate; a cationic surface active agent such as benzalkonium chloride, alkyltrimethylammonium chloride or dialkyldimethylammonium chloride; and the like. Among them, from the viewpoint that great dispersing power is imparted and biodegradation easily occurs, sodium n-paraffinsulfonate is preferable. From the viewpoint that great dispersing power is imparted, benzalkonium chloride is preferable.

As the auxiliary dispersant, in general, a surface active agent which is charged with reverse electricity to the surface charge of the inorganic dispersant is used. For instance, in the case that tricalcium phosphate of which surface is charged with positive electricity is used as the inorganic dispersant, in general, the anionic surface active agent such as sodium n-paraffinsulfonate or sodium dodecylbenzenesulfonate is used. In the case that kaolin of which surface is charged with negative electricity is used as the inorganic dispersant, in general, the cationic surface active agent such as benzalkonium chloride or dialkyldimethylammonium chloride is used. Among them, from the viewpoint that dispersing power is great, the combination of tricalcium phosphate and sodium n-paraffinsulfonate is preferable.

As mentioned above, in general, the combination of the inorganic dispersant and the auxiliary dispersant which is charged with reverse electricity to the charge of the inorganic dispersant is employed. As a result, a hydrophilic group (ionic group) of the auxiliary dispersant mutually functions with the surface of the inorganic dispersant, the surface of the inorganic dispersant becomes hydrophobic by a hydrophobic group of the auxiliary dispersant, and mutual function power of the surface of the inorganic dispersant with the surface of the hydrophobic thermoplastic resin particles is improved. That is, the auxiliary dispersant functions as a binder between the thermoplastic resin particles and the inorganic dispersant, so that dispersing power is heightened.

In the present invention, the pre-expanded particles prepared by the pressure release expansion method are washed. The particles are washed with the aqueous solution of a water soluble compound having at least one functional group capable of bonding to the surface of the inorganic dispersant and at least one hydrophilic functional group in its molecule. The above water soluble compound is a compound of which solubility with water at ordinal temperature is at least 1 g/100 g (water), preferably at least about 5 g/100 g (water).

The capability of bonding to the surface of the inorganic dispersant shows existence of reverse ionicity to ionicity on the surface of the inorganic dispersant, and is capability of ionic bonding. The functional group capable of bonding to the surface of the inorganic dispersant is a functional group showing reverse ionicity to ionicity on the surface of the inorganic dispersant.

The above hydrophilic functional group is a group such as a polar group or a dissociated group, which weakly bonds to water molecule by electrostatic mutual function or hydrogen bond, and which shows affinity with water.

Concretely, for instance, in the case that tricalcium phosphate of which surface is charged with positive electricity is used as the inorganic dispersant, as a washing agent, there is used an aqueous solution of a water soluble compound having a functional group capable of bonding to the surface of the inorganic dispersant, such as an anionic functional group such as phosphoric acid group (ion), carboxyl group (ion) or silicic acid ion in its molecule, and having a hydrophilic functional group such as phosphoric acid group (ion), carboxyl group (ion), silicic acid ion or alcoholic hydroxy group in its molecule. The functional group capable of bonding to the surface of the inorganic dispersant may be the same as or different from the hydrophilic functional group. Concrete examples of the water soluble compound are, for instance, a water soluble condensated phosphate such as sodium pyrophosphate, sodium tripolyphosphate or sodium hexametaphosphate; a water soluble phosphate such as trisodium phosphate or tripotassium phosphate; a mixture of the water soluble condensated phosphate and the water soluble phosphate; a water soluble silicate such as sodium metasilicate or sodium orthosilicate; a water soluble ethylenediaminetetraacetate such as disodium ethylenediaminetetraacetate or tetrasodium ethylenediaminetetraacetate; a water soluble citrate such as sodium citrate; a water soluble tartrate such as sodium tartrate; a mixture of the water soluble citrate and the water soluble tartrate (water soluble hydroxycarboxylate); a sodium polyacrylate; and the like. These can be used alone or in admixture thereof. Among them, from the viewpoint that washing effect is more great, the water soluble condensated phosphate is preferable. From the viewpoint that pH of the aqueous solution becomes 7.5 or so and handling of the aqueous solution is easy, sodium hexametaphosphate is particularly preferable.

For instance, in the case that kaolin of which surface is charged with negative electricity is used as the inorganic dispersant, as a washing agent, there is used an aqueous solution of a water soluble compound having a functional group capable of bonding to the surface of the inorganic dispersant, such as a cationic functional group such as amino group (ion), quaternary ammonium ion or pyridinium group in its molecule, and having a hydrophilic functional group such as amino group (ion), quaternary ammonium ion, pyridinium group or alcoholic hydroxy group in its molecule. The functional group capable of bonding to the surface of the inorganic dispersant may be the same as or different from the hydrophilic functional group. Concrete examples of the water soluble compound are, for instance, a water soluble polyvinylpyridinium compound such as poly-4-vinyl-N-ethylpyridinium bromide; polyoxyethylenealkylamine; an ethylenediaminetetraacetate such as disodium ethylenediaminetetraacetate or tetrasodium ethylenediaminetetraacetate; ethylenediaminehydrochloride; and the like. These can be used alone or in admixture thereof. Among them, from the viewpoint that washing effect is more great, ethylenediaminehydrochloride is preferable.

When the pre-expanded particles are washed with the aqueous solution of the water soluble compound having at least one, preferably 2 to 500 functional groups capable of bonding to the surface of the inorganic dispersant in its molecule, and having at least one, preferably 2 to 500 hydrophilic functional groups in its molecule, the amount of the attaching dispersant decreases. In addition, because pH of the aqueous solution of the water soluble compound, used for washing is, in general, 6 to 11 (the aqueous solution showing higher pH can be used because pH is adjusted to 7 to 8 with an acid), no acid resistant equipment which has been conventionally used for washing with an acidic aqueous solution is needed. Also, there are employed no conventionally needed steps for waste liquid in washing with an acidic aqueous solution, such as a neutralization and reprecipitation step, an aggregation and precipitation step, and as occasion demands, an adsorption and removal step (this step is needed, because particle size of precipitated particles which have been neutralized and reprecipitated becomes small, so that it is difficult for the particles to aggregate and precipitate). That is, waste liquid in washing can be treated by only the aggregation and precipitation step, and steps are simplified and cost becomes low.

For the reason about decrease of the amount of the attaching dispersant in accordance with the above washing, it is considered that because the functional group of the water soluble compound in the aqueous solution as the washing agent bonds to the surface of the inorganic dispersant and hydrophilic property is imparted to the surface of the inorganic dispersant by the hydrophilic group in the washing agent, binder effect of the auxiliary dispersant is weakened and the amount of the attaching dispersant decreases.

The stage for washing the pre-expanded particles is not particularly limited. From the viewpoint that washing effect becomes great and the washing step is hardly lengthened, it is desired that the particles are washed just after pre-expansion.

The concentration of the water soluble compound in the washing agent varies according to the kinds and the amount of the inorganic dispersant and the auxiliary dispersant. In general, the concentration is preferably 5 to 500 ppm, more preferably 20 to 300 ppm. The amount of the washing agent is preferably 5 to 40 L per 1 kg of the pre-expanded particles, more preferably 10 to 30 L per 1 kg of the pre-expanded particles. From the viewpoint that dispersion about expansion ratio of the pre-expanded particles can be decreased, it is desired that the temperature of the washing agent is about 50° to 80° C.

Because the amount of the washing agent is greatly less than the amount of water or warm water, that is, 40 to 80 L per 1 kg of the pre-expanded particles in washing with water or warm water, the method of the present invention is economical and also, waste water in washing can be easily treated.

Examples of the method for washing the pre-expanded particles with the washing agent are, for instance, a method comprising blowing the washing agent to the pre-expanded particles through a shower nozzle, a method comprising immersing the pre-expanded particles in the washing agent, and the like. The method is not limited to the exemplified ones.

The pre-expanded particles prepared by the above pressure release expansion method are washed with the aqueous solution of the water soluble compound having at least one functional group capable of bonding to the surface of the inorganic dispersant and at least one hydrophilic functional group in its molecule, so that the amount of the attaching dispersant can be decreased to 300 to 600 ppm, from 1000 to 2000 ppm.

The pre-expanded particles applied for the method of the present invention are, as mentioned above, particles which have been prepared by impregnating the aqueous dispersion in which the thermoplastic resin particles have been dispersed in water with the inorganic dispersant and the auxiliary dispersant, with the volatile blowing agent at high temperature and high pressure, and then, pre-expanding the thermoplastic resin particles by the pressure release expansion method.

Examples of a thermoplastic resin from which the above thermoplastic resin particles are made are, for instance, low density polyethylene, medium density polyethylene, high density polyethylene, linear low density polyethylene, polypropylene homopolymer, ethylene-propylene random copolymer, propylene-butene random copolymer, ethylene-propylene-butene random copolymer, polybutene, polystyrene and the like. These can be used alone or in admixture thereof. It is possible that to the thermoplastic resin are added a cell nucleating agent, an antioxidant, a weather resistant, an antistatic agent, a flame retardant, a lubricant, a crystal nucleating agent and the like to give resin particles.

The amount of the inorganic dispersant and the auxiliary dispersant varies according to the kinds thereof, and the kinds and the amount of the thermoplastic resin particles. In general, it is desired that the amount of the inorganic dispersant is about 0.2 to 3 parts by weight (hereinafter referred to as "parts(s)") based on 100 parts of water, and the amount of the auxiliary dispersant is about 0.001 to 0.1 part based on 100 parts of water.

Typical examples of the above volatile blowing agent are, for instance, isobutane, n-butane, n-pentane, propane, carbon dioxide, nitrogen and the like. The volatile blowing agent is not limited to the exemplified ones. It is desired that the amount of the volatile blowing agent is about 5 to 50 parts based on 100 parts of the thermoplastic resin particles.

The temperature and pressure during the pressure release expansion by impregnating the thermoplastic resin particles with the volatile blowing agent vary according to the kinds of the thermoplastic resin particles and the expansion ratio of the aimed pre-expanded particles. The temperature may be at lowest softening point of the thermoplastic resin. In general, it is desired that the temperature is about 100° to 150° C., and the pressure is about 5 to 30 kg/cm$^2$·G. Also, it is desired that the expansion ratio of the pre-expanded particles is about 5 to 40 times.

The equipment (pressure container) is not particularly limited. The equipments which can resist the pressure and the temperature in the pre-expansion step may be used. Concrete examples of the equipment are, for instance, an autoclave type pressure container and the like.

As preferable embodiment of the method of the present invention, there can be cited
a method comprising
  charging the autoclave type pressure container with 100 parts of a polyolefin resin particles (melting point: Tm° C.), 150 to 500 parts of water, 0.2 to 3 parts of tricalcium phosphate as the inorganic dispersant, 0.001 to 0.1 part of sodium n-paraffinsulfonate as the auxiliary dispersant and 5 to 30 parts of isobutane as the volatile blowing agent,
  increasing the temperature of the contents,
  impregnating the polyolefin resin particles with isobutane at the constant temperature within the range of (Tm−

10)° to (Tm+10)° C. and the constant pressure within the range of 10 to 30 kg/cm²·G, releasing the polyolefin resin particles into atmospheric pressure to give pre-expanded particles, and immediately washing the pre-expanded particles by blowing an aqueous solution (50° to 80° C.) thereon, containing 20 to 300 ppm of sodium hexametaphosphate, in an amount of 10 to 30 L per 1 kg of the pre-expanded particles, through the shower nozzle.

The method for washing pre-expanded particles of the present invention is more specifically explained by means of the following Examples, and it is to be understood that the present invention is not limited to the Examples.

EXAMPLES 1 TO 12 AND COMPARATIVE EXAMPLES 1 TO 7

The autoclave type pressure container was charged with 100 parts of pellet of ethylene-propylene random copolymer (melting point: 149° C., weight of one particle: about 1.8 mg), 300 parts of water, 1.0 part of the inorganic dispersant shown in Table 1, 0.01 part of the auxiliary dispersant shown in Table 1 and 12.0 parts of isobutane. The temperature of the contents was increased to 148.5° C. with stirring and kept for 20 minutes. Then, by additionally press fitting isobutane thereto, the internal pressure of the container was adjusted to 19.3 kg/cm²·G and kept for 10 minutes. Then, with keeping the temperature and the internal pressure of the container constant by press fitting isobutane thereto, a valve in the lower part of the pressure container was opened and an aqueous dispersion was released into atmospheric pressure through an orifice (open diameter: 4 mmφ) to give pre-expanded particles. Just after the aqueous dispersion was released through the orifice to give the pre-expanded particles, the pre-expanded particles were shower washed with a washing liquid (60° C.) shown in Table 1 at a concentration and in a liquid amount per 1 kg of the pre-expanded particles shown in Table 1. The expansion ratio of the washed pre-expanded particles was 24 to 26 times.

After the washed pre-expanded particles were dried at 70° C. in a hot-air drier, the amount of the attaching dispersant was measured in accordance with the following method. The results are shown in Table 1.

Waste water is treated by a method comprising adding a precipitating agent such as aluminum ion, trivalent iron ion or a high molecular aggregating agent to waste water, aggregating a dispersant and carrying out precipitation and filtration. In washing according to the method of the present invention, the amount of water to be used can be decreased in comparison with washing with warm water. Accordingly, the amount of the precipitating agent and necessary time for treating waste water (treating power for waste water of equipment) can be saved.

On the other hand, in washing with an acidic aqueous solution, a reprecipitation step by neutralization is firstly needed. Then, the same aggregation and precipitation step as in the above washing with warm water and in the above washing according to the method of the present invention is carried out. In this case, in addition to necessity of the extra reprecipitation step, fine particles are easily prepared in the reprecipitation step by neutralization, so that a larger amount of the precipitating agent is needed in the later aggregation and precipitation step.

(Amount of attaching dispersant)

① Inorganic dispersant: Tricalcium phosphate

To a conical beaker were collected and added 50.0 mL of an aqueous solution (colorimetric solution) containing 0.022% by weight (hereinafter referred to as "%") of ammonium metavanadate, 0.54% of ammonium molybdate and 3% of nitric acid, and "W" (g) of the pre-expanded particles. After these were stirred for 1 minute, these were allowed to stand for 10 minutes. The obtained aqueous solution (coloring solution) was poured into a fused cell having an optical path length of 1.0 cm, and then, absorbance "A" at a wavelength of 410 nm was measured by a spectrophotometer.

As to the same colorimetric solution, by using previously measured absorptivity "ε" (g/L·cm) of tricalcium phosphate at a wavelength of 410 nm, the amount of the attaching dispersant "X" (ppm) was calculated in accordance with the following equation:

$$X(ppm) = \frac{5.0 \times 10^4 \cdot \varepsilon \cdot A}{W}$$

② Inorganic dispersant: Kaolin

To a crucible were collected and added "Wr" (g) of the pre-expanded particles, and the pre-expanded particles were heated by using a gas burner till the particles completely became to be ashes. Then, the weight of the residual ashes "Wa" (g) was measured. By the same manner as this, using "Wp" (g) of the resin particles which had not been pre-expanded yet, the weight of the residual ashes of these resin particles "Wb" (g) was measured. Using the measured values, the amount of the attaching dispersant "X" (ppm) was calculated in accordance with the following equation:

$$X(ppm) = \left[\frac{Wa}{Wr} - \frac{Wb}{Wp}\right] \times 10^6$$

TABLE 1

| | Aqueous dispersion | | Washing liquid | | | |
| --- | --- | --- | --- | --- | --- | --- |
| Ex. No. | Inorganic dispersant | Auxiliary dispersant | Kinds | Concentration (ppm) | Liquid amount (L/kg (Pre-expanded particles)) | Amount of attaching dispersant (ppm) |
| 1 | Tricalcium phosphate | Sodium n-paraffinsulfonate | Trisodium phosphate aqueous solution | 50 | 30 | 480 |
| 2 | Tricalcium phosphate | Sodium n-paraffinsulfonate | Sodium hexametaphosphate aqueous solution | 15 | 30 | 320 |
| 3 | Tricalcium phosphate | Sodium n-paraffinsulfonate | Sodium hexametaphosphate aqueous solution | 50 | 30 | 300 |

TABLE 1-continued

| | Aqueous dispersion | | Washing liquid | | Liquid amount (L/kg (Pre-expanded particles)) | Amount of attaching dispersant (ppm) |
|---|---|---|---|---|---|---|
| Ex. No. | Inorganic dispersant | Auxiliary dispersant | Kinds | Concentration (ppm) | | |
| 4 | Tricalcium phosphate | Sodium n-paraffinsulfonate | Sodium hexametaphosphate aqueous solution | 100 | 30 | 280 |
| 5 | Tricalcium phosphate | Sodium n-paraffinsulfonate | Sodium hexametaphosphate aqueous solution | 50 | 15 | 360 |
| 6 | Tricalcium phosphate | Sodium n-paraffinsulfonate | Sodium pyrophosphate aqueous solution | 50 | 30 | 320 |
| 7 | Tricalcium phosphate | Sodium n-paraffinsulfonate | Sodium tripolyphosphate aqueous solution | 50 | 30 | 350 |
| 8 | Tricalcium phosphate | Sodium n-paraffinsulfonate | Sodium metasilicate aqueous solution | 50 | 30 | 520 |
| 9 | Tricalcium phosphate | Sodium n-paraffinsulfonate | Disodium ethylenediaminetetraacetate aqueous solution | 50 | 30 | 430 |
| 10 | Tricalcium phosphate | Sodium n-paraffinsulfonate | Sodium citrate aqueous solution | 50 | 30 | 520 |
| 11 | Tricalcium phosphate | Sodium n-paraffinsulfonate | Sodium polyacrylate aqueous solution | 50 | 30 | 540 |
| 12 | Kaolin | Benzalkonium chloride | Ethylenediamine hydrochloride aqueous solution | 50 | 30 | 580 |
| Com. Ex. 1 | Tricalcium phosphate | Sodium n-paraffinsulfonate | Warm water | — | 15 | 1960 |
| 2 | Tricalcium phosphate | Sodium n-paraffinsulfonate | Warm water | — | 15 | 1960 |
| 3 | Tricalcium phosphate | Sodium n-paraffinsulfonate | Warm water | — | 60 | 1000 |
| 4 | Tricalcium phosphate | Sodium n-paraffinsulfonate | Sodium acetate aqueous solution | 50 | 30 | 1180 |
| 5 | Tricalcium phosphate | Sodium n-paraffinsulfonate | Glycerin aqueous solution | 50 | 30 | 1200 |
| 6 | Kaolin | Benzalkonium chloride | Warm water | — | 30 | 1820 |
| 7 | Kaolin | Benzalkonium chloride | Ammonium chloride aqueous solution | 50 | 30 | 1570 |

From the results shown in Table 1, it can be understood that in Examples 1 to 12 according to the method of the present invention, in comparison with Comparative Examples 1 to 7 according to the conventional method, the amount of the attaching dispersant is extremely small such as 280 to 580 ppm.

TEST EXAMPLES 1 TO 3 AND COMPARATIVE TEST EXAMPLES 1 TO 3

To a pressure container were added each pre-expanded particles prepared in Example 3 or Comparative Example 2, and the particles were compressed at an air pressure of 2.5 kgf/cm$^2$·G. A mold (internal length: 50 mm×300 mm×300 mm) was compression filled with the compressed particles and then, molding was carried out by using vapor having a molding heat pressure shown in Table 2. After the obtained molded article was dried at 80° C. for 12 hours in an oven, the dried molded article was gradually cooled to room temperature. Density of the molded article was calculated and tensile elongation of the molded article was calculated in accordance with the following method. The results are shown in Table 2.
(Tensile elongation)

The molded article was cut into a dumb-bell test piece (thickness: 10±0.5 mm, width of parallel part: 10±0.5 mm, length between marked lines: 50±0.5 mm) so that no surface layer of the molded article remained. After the dumb-bell test piece was allowed to stand in a room at 20° C. for at least 24 hours, tension test was carried out under the condition at tensile speed of 100 mm/min. and measuring temperature of 20° C. At breakpoint, migration length "L" (cm) between marked lines was measured, and tensile elongation was calculated in accordance with the following equation:

$$\text{Tensile elongation (\%)} = \frac{L - Lo}{Lo} \times 100$$

wherein "Lo" (cm) was length between marked lines before measuring.

Thus calculated tensile elongation is a barometer of fusion between pre-expanded particles.

TABLE 2

| Test Example No. | Pre-expanded particles | Molding heat pressure (kgf/cm$^2$ · G) | Density of molded article (g/L) | Tensile elongation (%) |
|---|---|---|---|---|
| 1 | Example 3 | 3.8 | 46 | 11.3 |
| 2 | Example 3 | 4.0 | 45 | 14.9 |
| 3 | Example 3 | 4.2 | 45 | 16.4 |

TABLE 2-continued

|  | Pre-expanded particles | Molding heat pressure (kgf/cm² · G) | Density of molded article (g/L) | Tensile elongation (%) |
|---|---|---|---|---|
| Comparative Test Example |  |  |  |  |
| 1 | Comparative Example 2 | 3.8 | 46 | 8.1 |
| 2 | Comparative Example 2 | 4.0 | 45 | 10.1 |
| 3 | Comparative Example 2 | 4.2 | 45 | 11.1 |

From the results shown in Table 2, it can be understood that when the molded article is produced as in Test Examples 1 to 3, by using the pre-expanded particles of Example 3, which have been washed in accordance with the method of the present invention, tensile elongation is large and short fusion between the pre-expanded particles hardly occurs.

INDUSTRIAL APPLICABILITY

When the pre-expanded particles prepared by the pressure release expansion method are washed according to the method of the present invention, the amount of the attaching inorganic dispersant can be decreased by using the same equipment as in washing with water or warm water and without consuming a large amount of water or warm water. As a result, an internal die expansion molded article having excellent properties can be produced.

What is claimed is:

1. A method for washing pre-expanded particles, the particles prepared by a) charging a container with an aqueous dispersion containing thermoplastic resin particles, a substantially water insoluble inorganic compound as a dispersant and a surface active agent, and a blowing agent; b) increasing the temperature of the container to a constant temperature; c) maintaining the constant temperature and a constant pressure in the container so as to impregnate the thermoplastic resin particles with the blowing agent; and d) releasing the particles into an atmosphere having a lower pressure than the constant pressure of the container to form pre-expanded particles, wherein said substantially water insoluble inorganic compound attaches to said pre-espanded particles, the method comprising:

a) providing an aqueous washing solution of a water soluble compound, said water soluble compound having a solubility with water of at least 1 g/100 g of water and having 1–500 surface bonding functional groups which bond to a surface of the substantially water insoluble inorganic compound and 1–500 hydrophilic functional groups, said aqueous washing solution having a pH of 6 to 11; and b) washing said pre-expanded particles by contacting said pre-expanded particles having said substantially water insoluble inorganic compound with said aqueous washing solution, wherein one of said surface bonding functional groups of said water soluble compound bonds to the surface of said substantially water insoluble inorganic compound attached to said pre-expanded particles.

2. The method of claim 1, wherein the substantially water insoluble inorganic compound is tricalcium phosphate, and the water soluble compound is a water soluble phosphate, a water soluble condensated phosphate or a mixture thereof.

3. The method of claim 1, wherein the substantially water insoluble inorganic compound is tricalcium phosphate, and the water soluble compound is a water soluble silicate.

4. The method of claim 1, wherein the substantially water insoluble inorganic compound is tricalcium phosphate, and the water soluble compound is a water soluble ethylenediaminetetraacetate.

5. The method of claim 1, wherein the substantially water insoluble inorganic compound is tricalcium phosphate, and the water soluble compound is a water soluble citrate, a water soluble tartrate or a mixture thereof.

6. The method of claim 1, wherein the substantially water insoluble inorganic compound is tricalcium phosphate, and the water soluble compound is sodium polyacrylate.

7. The method of claim 1, wherein the substantially water insoluble inorganic compound is kaolin, and the water soluble compound is ethylenediaminehydrochloride.

8. The method of claim 1, wherein the substantially water insoluble inorganic compound is selected from the group consisting of tricalcium phosphate and kaolin.

9. The method of claim 1, wherein the water soluble compound is selected from the group consisting of a water soluble phosphate, a water soluble condensated phosphate, a mixture of the water soluble phosphate and the water soluble condensated phosphate, a water soluble silicate, a water soluble ethylenediaminetetraacetate, a water soluble citrate, a water soluble tartrate, a mixture of the water soluble citrate and the water soluble tartrate, a sodium polyacrylate, and ethylenediaminehydrochloride.

10. The method of claim 1, wherein the substantially water insoluble inorganic compound is selected from the group consisting of tricalcium phosphate and kaolin; and the water soluble compound is selected from the group consisting of a water soluble phosphate, a water soluble condensated phosphate, a mixture of the water soluble phosphate and the water soluble condensated phosphate, a water soluble silicate, a water soluble ethylenediaminetetraacetate, a water soluble citrate, a water soluble tartrate, a mixture of the water soluble citrate and water soluble tartrate, a sodium polyacrylate, and ethylenediaminehydrochloride.

11. The method of claim 2, wherein the water soluble condensated phosphate is sodium hexametaphosphate.

* * * * *